United States Patent
Eryurek et al.

(10) Patent No.: US 6,594,603 B1
(45) Date of Patent: *Jul. 15, 2003

(54) RESISTIVE ELEMENT DIAGNOSTICS FOR PROCESS DEVICES

(75) Inventors: Evren Eryurek, Minneapolis, MN (US); Steven R. Esboldt, Eagan, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/409,114

(22) Filed: Sep. 30, 1999

Related U.S. Application Data (63) Continuation-in-part of application No. 09/175,832, filed on Oct. 19, 1998, now Pat. No. 6,519,546.

(51) Int. Cl.$^7$ ............................................... G06F 19/00
(52) U.S. Cl. ..................... 702/104; 702/99; 702/130; 374/174; 374/1; 324/601
(58) Field of Search ............................. 73/1.15, 1.57; 374/1, 172; 324/601, 718; 702/104, 99, 130, 133, 136; 700/282; 709/250

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart et al. | 128/2.05 |
| 3,688,190 A | 8/1972 | Blum | 324/61 R |
| 3,691,842 A | 9/1972 | Akeley | 73/398 C |
| 3,701,280 A | 10/1972 | Stroman | 73/194 |

(List continued on next page.)

FOREIGN PATENT DOCUMENTS

| | | |
|---|---|---|
| DE | 32 13 866 A1 | 10/1983 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |

(List continued on next page.)

OTHER PUBLICATIONS

Journal of Intelligent Manufacturing (1997) 8, 271–276 article entitled "On–line tool condition monitoring system with wavelet fuzzy neural network".

"On–line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *Commun. Statis.—Simula.*, 1995, pp. 409–437.

"A Knowledge–Based Approach for Detection and Diagnosis of Out–Of–Control Events in Manufacturing Processes," by P. Love et al., *IEEE*, 1989, pp. 736–741.

(List continued on next page.)

*Primary Examiner*—Kamini Shah
(74) *Attorney, Agent, or Firm*—Westman, Champlin & Kelly (57) ABSTRACT

Diagnostic circuitry of a process device is used to detect degradation of a resistive element of the process device while the process device remains online and without an additional power source. The diagnostic circuitry includes a testing circuit and a processing system. The testing circuit is coupled to the resistive element and is configured to apply a test signal to the resistive element. The test signal heats the resistive element and causes the resistive element to generate a response signal. The processing system compares a time constant of the response signal to a corresponding reference to detect degradation of the resistive element.

29 Claims, 4 Drawing Sheets

U.S. PATENT DOCUMENTS

| | | | |
|---|---|---|---|
| 3,849,637 A | 11/1974 | Caruso et al. | 235/151 |
| 3,855,858 A | 12/1974 | Cushing | 73/194 |
| 3,952,759 A | 4/1976 | Ottenstein | 137/12 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,249,164 A | 2/1981 | Tivy | 340/870.3 |
| 4,250,490 A | 2/1981 | Dahlke | 340/870.37 |
| 4,279,013 A | 7/1981 | Cameron et al. | 364/105 |
| 4,337,516 A | 6/1982 | Murphy et al. | 364/551 |
| 4,399,824 A | 8/1983 | Davidson | 128/736 |
| 4,417,312 A | 11/1983 | Cronin et al. | 364/510 |
| 4,517,468 A | 5/1985 | Kemper et al. | 290/52 |
| 4,530,234 A | 7/1985 | Cullick et al. | 73/53 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,642,782 A | 2/1987 | Kemper et al. | 706/25 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,707,796 A * | 11/1987 | Calabro et al. | 702/34 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,777,585 A | 10/1988 | Kokawa et al. | 364/164 |
| 4,791,352 A | 12/1988 | Frick et al. | 324/60 |
| 4,818,994 A | 4/1989 | Orth et al. | 340/870.21 |
| 4,831,564 A | 5/1989 | Suga | 364/551.01 |
| 4,841,286 A | 6/1989 | Kummer | 340/653 |
| 4,853,693 A | 8/1989 | Eaton-Williams | 340/588 |
| 4,873,655 A | 10/1989 | Kondraske | 364/553 |
| 4,907,167 A | 3/1990 | Skeirik | 364/500 |
| 4,924,418 A | 5/1990 | Bachman et al. | 364/550 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,043,862 A | 8/1991 | Takahashi et al. | 364/162 |
| 5,053,815 A | 10/1991 | Wendell | 355/208 |
| 5,067,099 A | 11/1991 | McCown et al. | 364/550 |
| 5,081,598 A | 1/1992 | Bellows et al. | 364/550 |
| 5,083,091 A | 1/1992 | Frick et al. | 324/678 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/22 |
| 5,214,582 A | 5/1993 | Gray | 364/22 |
| 5,216,226 A | 6/1993 | Miyoshi | 219/497 |
| 5,224,203 A | 6/1993 | Skeirik | 395/11 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogura | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Broden et al. | 73/718 |
| 5,510,779 A | 4/1996 | Maltby et al. | 340/870.3 |
| 5,511,004 A | 4/1996 | Dubost et al. | 364/551.01 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,560,246 A | 10/1996 | Bottinger et al. | 73/861.15 |
| 5,561,599 A | 10/1996 | Lu | 364/164 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | 395/200.17 |
| 5,629,870 A | 5/1997 | Farag et al. | 364/551.01 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |

| Patent No. | Date | Inventor | Class |
|---|---|---|---|
| 5,654,869 A | 8/1997 | Ohi et al. | 361/540 |
| 5,661,668 A | 8/1997 | Yemini et al. | 364/550 |
| 5,665,899 A | 9/1997 | Willcox | 73/1.63 |
| 5,669,713 A * | 9/1997 | Schwartz et al. | 702/104 |
| 5,671,335 A | 9/1997 | Davis et al. | 395/23 |
| 5,675,504 A | 10/1997 | Serodes et al. | 364/496 |
| 5,675,724 A | 10/1997 | Beal et al. | 395/182.02 |
| 5,680,109 A | 10/1997 | Lowe et al. | 340/608 |
| 5,682,317 A | 10/1997 | Keeler et al. | 364/431.03 |
| 5,700,090 A | 12/1997 | Eryurek | 374/210 |
| 5,703,575 A | 12/1997 | Kirkpatrick | 340/870.17 |
| 5,704,011 A | 12/1997 | Hansen et al. | 395/22 |
| 5,705,978 A | 1/1998 | Frick et al. | 340/511 |
| 5,708,211 A | 1/1998 | Jepson et al. | 73/861.04 |
| 5,708,585 A | 1/1998 | Kushion | 364/431.061 |
| 5,710,370 A | 1/1998 | Shanahan et al. | 73/1.35 |
| 5,713,668 A | 2/1998 | Lunghofer et al. | 374/179 |
| 5,719,378 A | 2/1998 | Jackson, Jr. et al. | 219/497 |
| 5,736,649 A | 4/1998 | Kawasaki et al. | 73/861.23 |
| 5,741,074 A | 4/1998 | Wang et al. | 374/185 |
| 5,742,845 A | 4/1998 | Wagner | 395/831 |
| 5,746,511 A | 5/1998 | Eryurek et al. | 374/2 |
| 5,747,701 A | 5/1998 | Marsh et al. | 73/861.23 |
| 5,752,008 A | 5/1998 | Bowling | 395/500 |
| 5,764,891 A | 6/1998 | Warrior | 395/200.2 |
| 5,801,689 A | 9/1998 | Huntsman | 345/329 |
| 5,805,442 A | 9/1998 | Crater et al. | 364/138 |
| 5,817,950 A | 10/1998 | Wiklund et al. | 73/861.66 |
| 5,828,567 A | 10/1998 | Eryurek et al. | 364/184 |
| 5,829,876 A | 11/1998 | Schwartz et al. | 374/1 |
| 5,848,383 A | 12/1998 | Yunus | 702/104 |
| 5,859,964 A | 1/1999 | Wang et al. | 395/185.01 |
| 5,876,122 A | 3/1999 | Eryurek | 374/183 |
| 5,880,376 A | 3/1999 | Sai et al. | 73/861.08 |
| 5,887,978 A | 3/1999 | Lunghofer et al. | 374/179 |
| 5,908,990 A | 6/1999 | Cummings | 73/861.22 |
| 5,923,557 A | 7/1999 | Eidson | 364/471.03 |
| 5,924,086 A | 7/1999 | Mathur et al. | 706/25 |
| 5,926,778 A | 7/1999 | Poppel | 702/130 |
| 5,936,514 A | 8/1999 | Anderson et al. | 340/310.01 |
| 5,940,290 A | 8/1999 | Dixon | 364/138 |
| 5,956,663 A | 9/1999 | Eryurek et al. | 702/183 |
| 5,970,430 A | 10/1999 | Burns et al. | 702/122 |
| 6,005,500 A | 12/1999 | Gaboury et al. | 341/43 |
| 6,014,902 A | 1/2000 | Lewis et al. | 73/861.12 |
| 6,016,523 A | 1/2000 | Zimmerman et al. | 710/63 |
| 6,016,706 A | 1/2000 | Yamamoto et al. | 9/6 |
| 6,017,143 A | 1/2000 | Eryurek et al. | 700/51 |
| 6,023,399 A | 2/2000 | Kogure | 361/23 |
| 6,038,579 A | 3/2000 | Sekine | 708/400 |
| 6,045,260 A | 4/2000 | Schwartz et al. | 374/183 |
| 6,047,220 A | 4/2000 | Eryurek et al. | 700/28 |
| 6,047,222 A | 4/2000 | Burns et al. | 700/79 |
| 6,052,655 A | 4/2000 | Kobayashi et al. | 702/184 |
| 6,072,150 A | 6/2000 | Sheffer | 219/121.83 |
| 6,112,131 A | 8/2000 | Ghorashi et al. | 700/142 |
| 6,119,047 A | 9/2000 | Eryurek et al. | 700/28 |
| 6,119,529 A | 9/2000 | DiMarco et al. | 73/861.68 |
| 6,139,180 A * | 10/2000 | Usher et al. | 374/1 |
| 6,192,281 B1 | 2/2001 | Brown et al. | 700/2 |
| 6,195,591 B1 | 2/2001 | Nixon et al. | 700/83 |
| 6,199,018 B1 | 3/2001 | Quist et al. | 702/34 |
| 6,236,948 B1 | 5/2001 | Eck et al. | 702/45 |
| 6,263,487 B1 | 7/2001 | Stripf et al. | 717/1 |
| 6,298,377 B1 | 10/2001 | Hartikainen et al. | 709/223 |
| 6,311,136 B1 | 10/2001 | Henry et al. | 702/45 |
| 6,327,914 B1 | 12/2001 | Dutton | 73/861.356 |
| 6,347,252 B1 | 2/2002 | Behr et al. | 700/3 |
| 6,360,277 B1 | 3/2002 | Ruckley et al. | 709/250 |
| 6,370,448 B1 | 4/2002 | Eryurek | 700/282 |
| 6,377,859 B1 | 4/2002 | Brown et al. | 700/79 |
| 6,397,114 B1 | 5/2002 | Eryurek et al. | 700/51 |
| 6,425,038 B1 | 7/2002 | Sprecher | 710/269 |
| 6,519,546 B1 * | 2/2003 | Eryurek et al. | 702/130 |

FOREIGN PATENT DOCUMENTS

| | | | |
|---|---|---|---|
| DE | 195 02 499 A1 | 8/1996 | |
| DE | 296 00 609 U1 | 3/1997 | |
| DE | 197 04 694 A1 | 8/1997 | |
| DE | 199 05 071 A1 | 2/1999 | |
| DE | 19930660 A1 | 7/1999 | |
| DE | 299 17 651 U1 | 12/2000 | |
| EP | 0 122 622 A1 | 10/1984 | |
| EP | 0 413 814 A1 | 2/1991 | |
| EP | 0 487 419 A2 | 5/1992 | |
| EP | 0 512 794 A2 | 5/1992 | |
| EP | 0 594 227 A1 | 4/1994 | |
| EP | 0 624 847 A1 | 11/1994 | |
| EP | 0 644 470 A2 | 3/1995 | |
| EP | 0 807 804 A2 | 5/1997 | |
| EP | 0 825 506 A2 | 7/1997 | |
| EP | 0 827 096 A2 | 9/1997 | |
| EP | 0 838 768 A2 | 9/1997 | |
| EP | 1058093 A1 | 5/1999 | |
| EP | 1022626 | 7/2000 | |
| FR | 2 302 514 | 9/1976 | |
| FR | 2 334 827 | 7/1977 | |
| GB | 928704 | 6/1963 | |
| GB | 1 534 280 | * 11/1978 | G01B/31/00 |
| GB | 2 310 346 A | 8/1997 | |
| GB | 2342453 | 4/2000 | |
| GB | 2347232 | 8/2000 | |
| JP | 58-129316 | 8/1983 | |
| JP | 59-116811 | 7/1984 | |
| JP | 59163520 | 9/1984 | |
| JP | 59-211196 | 11/1984 | |
| JP | 59-211896 | 11/1984 | |
| JP | 60-507 | 1/1985 | |
| JP | 60-76619 | 5/1985 | |
| JP | 60-131495 | 7/1985 | |
| JP | 60174915 | 9/1985 | |
| JP | 62-30915 | 2/1987 | |
| JP | 64-1914 | 1/1989 | |
| JP | 64001914 | 1/1989 | |
| JP | 64-72699 | 3/1989 | |
| JP | 2-5105 | 1/1990 | |
| JP | 03229124 | 11/1991 | |
| JP | 5-122768 | 5/1993 | |
| JP | 06242192 | 9/1994 | |
| JP | 7-63586 | 3/1995 | |
| JP | 07234988 | 9/1995 | |
| JP | 8-54923 | 2/1996 | |
| JP | 08102241 | 4/1996 | |
| JP | 8-136386 | 5/1996 | |
| JP | 8-166309 | 6/1996 | |
| JP | 08247076 | 9/1996 | |
| JP | 08-313665 | * 9/1996 | G01N/27/04 |
| JP | 2712625 | 10/1997 | |
| JP | 2712701 | 10/1997 | |
| JP | 2753592 | 3/1998 | |
| JP | 07225530 | 5/1998 | |
| JP | 10 232170 | 9/1998 | |
| JP | 10-232170 | * 9/1998 | G01K/7/02 |
| JP | 10 232171 | 9/1998 | |
| JP | 11083575 | 3/1999 | |
| WO | WO 94/25933 | 11/1994 | |
| WO | WO 96/11389 | 4/1996 | |
| WO | WO 96/12993 | 5/1996 | |
| WO | WO 96/39617 | 12/1996 | |
| WO | WO 97/21157 | 6/1997 | |
| WO | WO 97/25603 | 7/1997 | |
| WO | WO 98/06024 | 2/1998 | |

| | | | |
|---|---|---|---|
| WO | WO 98/13677 | 4/1998 | |
| WO | WO 98/20469 | * 5/1998 | .......... G08C/19/02 |
| WO | WO 98/39718 | 9/1998 | |
| WO | WO 99/19782 | 4/1999 | |
| WO | WO 00/55700 | 9/2000 | |
| WO | WO 00/70531 | 11/2000 | |

OTHER PUBLICATIONS

Parallel, Fault–Tolerant Control and Diagnostics System for Feedwater Regulation in PWRS, by E. Eryurek et al., *Proceedings of the American Power Conference.*

"Programmable Hardware Architectures for Sensor Validation", by M.P. Henry et al., *Control Eng. Practice,* vol. 4, No. 10., pp. 1339–1354, (1996).

"Sensor Validation for Power Plants Using Adaptive Backpropagation Neural Network," *IEEE Transactions on Nuclear Science,* vol. 37, No. 2, by E. Eryurek et al. Apr. 1990, pp. 1040–1047.

"Signal Processing, Data Handling and Communications: The Case for Measurement Validation", by M.P. Henry, *Department of Engineering Science, Oxford University.*

"Smart Temperature Measurement in the '90s", by T. Kerlin et al., *C&I,* (1990).

"Software–Based Fault–Tolerant Control Design for Improved Power Plant Operation," *IEEE/IFAC Joint Symposium on Computer–Aided Control System Design,* Mar. 7–9, 1994 pp. 585–590.

A Standard Interface for Self–Validating Sensors, by M.P. Henry et al., *Report No. QUEL 1884/91,* (1991).

"Taking Full Advantage of Smart Transmitter Technology Now," by G. Orrison, *Control Engineering,* vol. 42, No. 1, Jan. 1995.

"Using Artificial Neural Networks to Identify Nuclear Power Plant States," by Israel E. Alguindigue et al., pp. 1–4.

"Keynote Paper: Hardware Compilation–A New Technique for Rapid Prototyping of Digital Systems–Applied to Sensor Validation", by M.P. Henry, *Control Eng. Practice,* vol. 3, No. 7., pp. 907–924, (1995).

"The Implications of Digital Communications on Sensor Validation", by M. Henry et al., *Report No. QUEL 1912/92,* (1992).

"In–Situ Response Time Testing of Thermocouples", *ISA,* by H.M. Hashemian et al., Paper No. 89–0056, pp. 587–593, (1989).

"An Integrated Architecture For Signal Validation in Power Plants," by B.R. Upadhyaya et al., *Third IEEE International Symposium on Intelligent Control,* Aug. 24–26, 1988, pp. 1–6.

"Integration of Multiple Signal Validation Modules for Sensor Monitoring," by B. Upadhyaya et al., *Department of Nuclear Engineering,* Jul. 8, 1990, pp. 1–6.

"Intelligent Behaviour for Self–Validating Sensors", by M.P. Henry, *Advances In Measurement,* pp. 1–7, (May 1990).

"Measurement of the Temperature Fluctuation in a Resistor Generating 1/F Fluctuation," by S. Hashiguchi, *Japanese Journal of Applied Physics,* vol. 22, No. 5, Part 2, May 1983, pp. L284–L286.

"Check of Semiconductor Thermal Resistance Elements by the Method of Noise Thermometry", by A. B. Kisilevskii et al., *Measurement Techniques,* vol. 25, No. 3, Mar. 1982, New York, USA, pp. 244–246.

"Neural Networks for Sensor Validation and Plant Monitoring," by B. Upadhyaya, *International Fast Reactor Safety Meeting,* Aug. 12–16, 1990, pp. 2–10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.,* vol. 45, No. 2, (Feb. 1974) pp. 151–162.

"Detection of Hot Spots in Thin Metal Films Using an Ultra Sensitive Dual Channel Noise Measurement System," by G.H. Massiha et al., *Energy and Information Technolgies in the Southeast,* vol. 3 of 3, Apr. 1989, pp. 1310–1314.

"Detecting Blockage in Process Connections of Differential Pressure Transmitters", by E. Taya et al., *SICE,* 1995, pp. 1605–1608.

"Development and Application of Neural Network Algorithms For Process Diagnostics," by B.R. Upadhyaya et al., *Proceedings of the 29th Conference on Decision and Control,* 1990, pp. 3277–3282.

"A Fault–Tolerant Interface for Self–Validating Sensors", by M.P. Henry, *Colloquium,* pp. 3/1–3/2 (Nov. 1990).

"Fuzzy Logic and Artificial Neural Networks for Nuclear Power Plant Applications," by R.C. Berkan et al., *Proceedings of the American Power Conference.*

"Fuzzy Logic and Neural Network Applications to Fault Diagnosis", by P. Frank et al., *International Journal of Approximate Reasoning,* (1997), pp. 68–88.

"A Decade of Progress in High Temperature Johnson Noise Thermometry," by T.V. Blalock et al., *American Institute of Physics,* 1982 pp. 1219–1223.

"Application of Neural Computing Paradigms for Signal Validation," by B.R. Upadhyaya et al., *Department of Nuclear Engineering,* pp. 1–18.

"Application of Neural Networks for Sensor Validation and Plant Monitoring," by B. Upadhyaya et al., *Nuclear Technology,* vol. 97, No. 2, Feb. 1992 pp. 170–176.

"Automated Generation of Nonlinear System Characterization for Sensor Failure Detection," by B.R. Upadhyaya et al., *ISA,* 1989 pp. 269–274.

IEEE Transactions on Magnetics, vol. 34, No. 5, Sep. 1998, "Optical Design of the Coils of an Electromagnetic Flow Meter," pp. 2563–2566.

IEEE Transactions on Magnetics, vol. 30, No. 2, Mar. 1994, "Magnetic Fluid Flow Meter for Gases," pp. 936–938.

IEEE Instrumentation and Measurement, "New approach to a main error estimation for primary transducer of electromagnetic flow meter," pp. 1093–1097.

"Additional Information From Flowmeters via Signal Analysis," by J.E. Amadi–Echendu and E.H. Higham, pp. 187–193.

PCT Notification of Transmittal of International Search Report and International Search Report for International Application NO. PCT/US 01/40791, filed May 22, 2001, mailed Mar. 11, 2002.

PCT Notification of Transmittal of International Search Report and International Search Report for International Application No. PCT/US 01/40782, filed May 22, 2001, mailed Mar. 18, 2002.

International Search Report dated Jul. 11, 2002 for International Application No. PCT/US 02/06606 filed Mar. 5, 2002.

International Search Report for International Application No. PCT/US 02/14934 issued May 8, 2002, date of mailing Aug. 28, 2002.

International Search Report for International Application No. PCT/US 02/14560 issued May 8, 2002, date of mailing Sep. 3, 2002.

Blevins et al. "Fieldbus Support for Process Analysis".

Hashemian, H. M. et al., "In–Situ Response Time Testing of Thermocouples," ISA, 1989, pp. 587–591.

Approval Standard Intrinsically Safe Apparatus and Associated App. for Use in Class I, II, and II div.!, Hazardous Classification Oct. 1988.

Process Measurement Instrument Engineers Handbook.

International Search Report dated Jul. 11, 2002 for International Application No. PCT/US 02/06606 filed Mar. 5, 2002.

"Field–Based Architecture is Based on Open Systems, Improves Plant Performance," by P. Cleaveland, *I& CS,* Aug. 1996, pp. 73–74.

"Tuned–Circuit Dual–Mode Johnson Noise Thermometers," by R.L. Shepard et al., Apr. 1992.

"Tuned–Circuit Johnson Noise Thermometry," by Michael Roberts et al., *7th Symposium on Space Nuclear Power Systems,* Jan. 1990.

"Survey, Applications, and Prospects of Johnson Noise Thermometry," by T. Blalock et al., *Electrical Engineering Department,* 1981 pp. 2–11.

"Noise Thermometry for Industrial and Metrological Applications at KFA Julich," by H. Brixy et al., *7th International Symposium on Temperature,* 1992.

"Johnson Noise Power Thermometer and its Application in Process Temperature Measurement," by T.V. Blalock et al., *American Institute of Physics,* 1982, pp. 1249–1259.

"In Situ Calibration of Nuclear Plant Platinum Resistance Thermometers Using Johnson Noise Methods," *EPRI,* Jun. 1983.

"Johnson Noise Thermometer for High Radiation and High–Temperature Environments," by L. Oakes et al., *Fifth Symposium on Space Nuclear Power Systems,* Jan. 1988, pp. 2–23.

"Development of a Resistance Thermometer For Use Up to 1600° C.", by M.J. de Groot et al., *CAL LAB,* Jul./Aug. 1996, pp. 38–41.

"Development of a Long–Life, High–Reliability Remotely Operated Johnson Noise Thermometer," by R.L. Shepard et al., *ISA,* 1991, pp. 77–84.

"Application of Johnson Noise Thermometry to Space Nuclear Reactors," by M.J. Roberts et al., *Presented at the 6th Symposium on Space Nuclear Power Systems,* Jan. 9–12, 1989.

"Sensor and Device Diagnositics for Predictive and Proactive Maintenance," by B. Boynton, *A Paper Presented at the Electric Power Research Institute—Fossil Plant Maintenance Conference* in Baltimore, Maryland, Jul. 29–Aug. 1, 1996, pp. 50–1–50–6.

"Smart Field Devices provide New Process Data, Increase System Flexibility," by Mark Boland, *I& CS,* Nov. 1994, pp. 45–51.

"Wavelet Analysis of Vibration, Part I: Theory[1], " by D. E. Newland, *Journal of Vibration and Acoustics,* vol. 116, Oct. 1994, pp. 409–416.

"Wavelet Analysis of Vibration, Part 2: Wavelet Maps," by D.E. Newland, *Journal of Vibration and Acoustic,* vol. 116, Oct. 1994, pp. 417–425.

"A Microcomputer–Based Instrument for Applications in Platinum Resistance Thermometry," by H. Rosemary Taylor and Hector A. Navarro, Journal of Physics E. Scientific Instrument, vol. 16, No. 11, pp. 1100–1104 (1983).

"Experience in Using Estelle for the Specification and Verification of a Fieldbus Protocol: FIP," by Barretto et al., Computer Networking, pp. 295–304 (1990).

"Computer Simulation of H1 Field Bus Transmission," by Utsumi et al., Advances in Instrumentation and Control, vol. 46, Part 2, pp. 1815–1827 (1991).

"Progress in Fieldbus Developments for Measuring and Control Application," by A. Schwaier, Sensor and Acuators, pp. 115–119 (1991).

"Ein Emulationssystem zur Leistungsanalyse von Feldbussystemen, Teil 1," by R. Hoyer, pp. 335–336 (1991).

"Simulatore Integrato: Controllo su bus di campo," by Barabino et al., Automazione e Strumentazione, pp. 85–91 (Oct. 1993).

"Ein Modulares, verteiltes Diagnose–Expertensystem für die Fehlerdiagnose in lokalen Netzen," by Jürgen M. Schroöder, pp. 557–565 (1990).

"Fault Diagnosis of Fieldbus Systems," by Jürgen Quade, pp. 577–581 (Oct. 1992).

"Ziele und Anwendungen von Feldbussystemen," by T. Pfeifer et al., pp. 549–557 (Oct. 1987).

"PROFIBUS–Infrastrukturmaβnahmen," by Tilo Pfeifer et al., pp. 416–419 (Aug. 1991).

"Simulation des Zeitverhaltens von Feldbussystemen," by O. Schnelle, pp. 440–442 (1991).

"Modélisation et simulation d'un bus de terrain: FIP," by Song et al, pp. 5–9 (undated).

"Feldbusnetz für Automatisierungssysteme mit intelligenten Funktionseinheiten," by W. Kriesel et al., pp. 486–489 (1987).

"Bus de campo para la inteconexión del proceso con sistemas digitales de control," Technologia, pp. 141–147 (1990).

"Dezentrale Installation mit Echtzeit–Feldbus," Netzwerke, Jg. Nr. 3 v. 14.3, 4 pages (1990).

"Process Measurement and Analysis," by Liptak et al., Instrument Engineers' Handbook, Third Edition, pp. 528–530, (1995).

"A microcomputer–based instrument for applications in platinum resistance thermometry", J. Phys. & Scientific Instrument, vol. 16 (1983), pp. 1100–1104.

"Fehlerdiagnose an Feldbussystemen," by Jurgen Quade, Munchen, pp. 577–581.

"Improving Dynamic Performance of Temperature Sensors with Fuzzy Control Technique," by Wang Lei, Measurement an dcontrol, University of Essen, pp. 872–873.

Microsoft Press, Computer Dictionary, Second Edition, The Comprehensive Standard for Business, School, Library, and Home, p. 156.

"A TCP/IP Tutorial" by, Socolofsky et al., Spider Systems Limited, Jan. 1991 pp. 1–23.

"Approval Standards For Explosionproof Electrical Equipment General Requirements", Factory Mutual Research, Cl. No. 3615, Mar. 1989, pp. 1–34.

"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1–70.

"Automation On–line" by, Phillips et al., Plant Services, Jul. 1997, pp. 41–45.

"Climb to New Heights by Controlling your PLCs Over the Internet" by, Phillips et al., Intech, Aug. 1998, pp. 50–51.

"CompProcessor For Piezoresistive Sensors" MCA Technologies Inc. (MCA7707), pp. 1–8.

"Ethernet emerges as viable, inexpensive fieldbus", Paul G. Schreier, Personal Engineering, Dec. 1997, pp. 23–29.

"Ethernet Rules Closed–loop System"by, Eidson et al., Intech, Jun. 1998, pp. 39–42.

"Fieldbus Standard for Use in Industrial Control Systems, Part 2: Physical Layer Specification and Service Definition", ISA–S50.02–1992, pp. 1–93.

"Fieldbus Standard for Use in Industrial Control Systems Part 3: Data Link Service Definition", ISA–S50.02–1997, Part 3, Aug. 1997, pp. 1–159.

Fieldbus Standard For Use in Industrial Control Systems Part 4: Data Link Protocol Specification, ISA–S50.02–1997, Part 4, Aug. 1997, pp. 1–148.

"Fieldbus Support For Process Analysis"by, Blevins et al., Fisher–Rosemount Systems, Inc., 1995, pp. 121–128.

"Fieldbus Technical Overview Understanding Foundation™ fieldbus technology", Fisher–Rosemount, 1998, pp. 1–23.

"Hypertext Transfer Protocol—HTTP/1.0" by, Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internet Technology Adoption into Automation" by, Fondl et al., Automation Business, pp. 1–5.

"Thermocouple Continuity Checker," IBM Technical Disclosure Bulletin, vol. 20, No. 5, pp. 1954 (Oct. 1977).

"A Self–Validating Thermocouple," Janice C–Y et al., IEEE Transactions on Control Systems Technology, vol. 5, No. 2, pp. 239–253 (Mar. 1997).

*Instrument Engineers' Handbook,* Chapter IV entitled "Temperature Measurements," by T.J. Claggett, pp. 266–333 (1982).

"EmWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, Rosemount Inc. (1997).

Warrior, J., "The Collision Between the Web and Plant Floor Automation," $6^{th}$. WWW Conference Workshop on Embedded Web Technology, Santa Clara, CA (Apr. 7, 1997).

Microsoft Press Computer Dictionary, $3^{rd}$ Edition, p. 124.

"Internal Statistical Quality Control for Quality Monitoring Instruments", by P. Girling et al., *ISA,* 15 pgs., 1999.

Web Pages from www.triant.com (3 pgs.).

"Statistical Process Control (Practice Guide Series Book)", *Instrument Society of America,* 1995, pp. 1–58 and 169–204.

"Time–Frequency Analysis of Transient Pressure Signals for a Mechanical Heart Valve Cavitation Study," *ASAIO Journal,* by Alex A. Yu et al., vol. 44, No. 5, pp. M475–M479, (Sep.–Oct. 1998).

"Transient Pressure Signals in Mechanical Heart Valve Caviation," by Z.J Wu et al., pp. M555–M561 (undated).

"Caviation in Pumps, Pipes and Valves," *Process Engineering,* by Dr. Ronald Young, pp. 47 and 49 (Jan. 1990).

"Quantification of Heart Valve Cavitation Based on High Fidelity Pressure Measurements," *Advances in Bioengineering 1994,* by Laura A. Garrison et al., BED–vol. 28, pp. 297–298 (Nov. 6–11, 1994).

"Monitoring and Diagnosis of Cavitation in Pumps and Valves Using the Wigner Distribution," *Hydroaccoustic Facilities, Instrumentation, and Experimental Techniques,* NCA–vol. 10, pp. 31–36 (1991).

"Developing Predictive Models for Cavitation Erosion," *Codes and Standards in A Global Environment,* PVP–vol. 259, pp. 189–192 (1993).

"Self–Diagnosing Intelligent Motors: A Key Enabler for Next Generation Manufacturing System," by Fred M. Discenzo et al., pp. 3/1–3/4 (1999).

Patent Application of Evren Eryurek et al., Serial No. 09/852/102, Filing Date May 9, 2001, entitled "Flow Diagnositc System".

Patent Application of Evren Eryurek et al., Serial No. 09/855,179, Filing Date May 14, 2001, entitled "Diagnostics for Industrial Process Control and Measurement Systems".

* cited by examiner

RESISTIVE ELEMENT DIAGNOSTICS FOR PROCESS DEVICES

This is a Continuation-in-part of U.S. Ser. No. 09/175,832, filed on Oct. 19, 1998 U.S. Pat. No. 6,519,546.

BACKGROUND OF THE INVENTION

Process devices are used in processing plants to monitor process variables and control industrial processes. Process devices are generally remotely located from a control room and are coupled to process control circuitry in the control room by a process control loop. The process control loop can be a 4–20 mA current loop that powers the process device and provides a communication link between the process device and the process control circuitry. Examples of process devices include process transmitters used to measure temperature, pressure, flow, pH, turbidity, level, or other process variables and various process control devices.

Resistive elements are typically found in process devices. Resistive elements can be process variable sensors, wires, coils, resistive temperature detectors, thermocouples, electrical traces, terminations, and other components of process devices having an electrical resistance. Generally, the condition of these resistive elements tends to degrade over time due to wear caused by use and environmental conditions that results in a decrease in performance. Depending on the resistive element, the decrease in performance may produce inaccurate measurements or cause the process device to fail. As a result, process devices are periodically tested to establish the condition of these resistive elements to determine whether measurements must be compensated or whether the resistive elements must be replaced.

For example, temperature transmitters can use resistive temperature detectors (RTD's) to measure the temperature of process mediums, such as a process fluid. An RTD is a resistive element that has a temperature-dependent resistance. The RTD is placed in thermal communication with the process fluid and the temperature transmitter injects a current into the RTD. The resultant voltage drop across the RTD is used to calculate the resistance of the RTD. The temperature of the process fluid is determined from the resistance of the RTD. As the condition of the RTD deteriorates, its relationship between resistance and temperature changes thus reducing the accuracy of its measurements. Consequently, temperature transmitters are periodically calibrated to compensate for the changing properties of the RTD.

Present calibration techniques are generally conducted offline. These techniques involve testing the process device at the location of the process device (on-site). One such offline calibration technique is the plunge test. Here, the RTD or temperature sensor is removed from the transmitter and placed in a bath of a known temperature. The output from the sensor is monitored and compared to the actual temperature of the bath to determine the amount of compensation required or calibration factor. The calibration factor is then stored in the processing system of the process device. The calibration factor is used to compensate the output of the process device such that the output accurately represents the temperature of the process medium being measured. Other offline calibration techniques involve injecting the resistive element with a test current and analyzing the response signal produced by the resistive element in response to the test current. These techniques generally utilize an additional power source due to the power limitations of the process device.

The above-mentioned calibration techniques are inadequate because they can require that the device be tested on-site, that the device be disassembled, and that an additional power supply be provided. Furthermore, they are typically time-consuming procedures that can significantly interrupt the operations of the processing plant.

SUMMARY

Diagnostic circuitry of a process device is used to detect degradation of a resistive element of the process device while the process device remains online, without the use of an additional power source, and without causing a significant interruption of the operations of the processing plant. The diagnostic circuitry includes a testing circuit and a processing system. The testing circuit is coupled to the resistive element and is configured to apply a test signal to the resistive element. The test signal heats the resistive element and causes the resistive element to generate a response signal. The processing system compares a time constant of the response signal to a corresponding reference to detect degradation of the resistive element.

DETAILED DESCRIPTION

Although the invention will be described with reference to specific embodiments of improved diagnostics for resistive elements of process devices, workers skilled in the art will recognize that changes can be made in form and detail without departing from the spirit and scope of the invention, which are defined by the appended claims.

Figure 1:
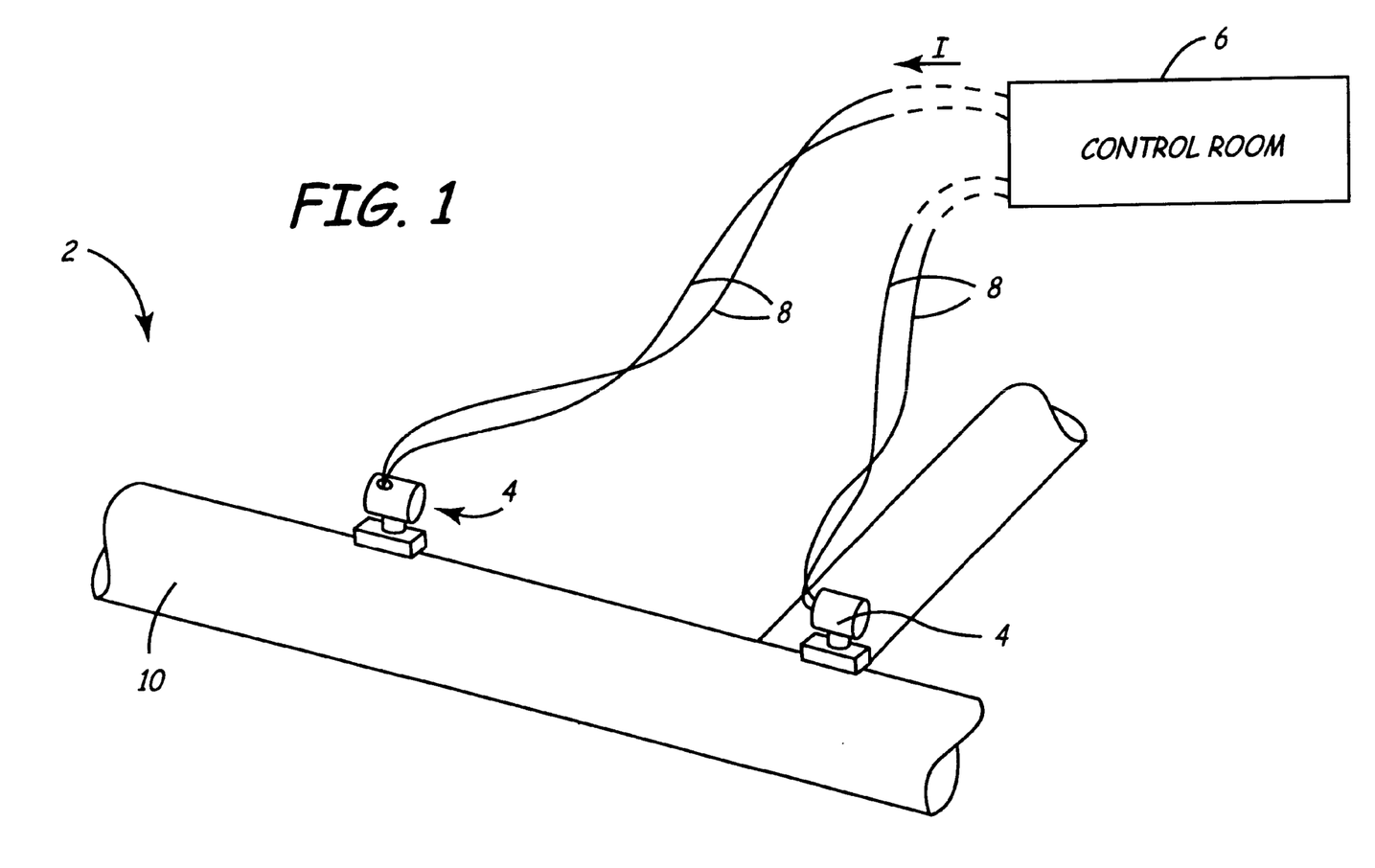
FIG. 1 is a diagram showing the environment of embodiments of the invention.

FIG. 1 is an environmental diagram showing a portion of a processing plant in which embodiments of the invention operate. Process control system 2 includes, for example, process devices 4 coupled electrically to control room 6 over two wire process control loops 8. Process control loops 8 provide a communication link with control room 6 and power to control devices 4. Process devices 4 are mounted on a process container, such as piping 10, containing a process element (e.g. a process fluid). In the example shown, process device 4 is a process variable transmitter for measuring a process variable such as temperature, pressure, or other process variable, and transmitting process variable data relating to the process variable to control room 6 over control loop 8. As one alternative to the example shown, process device 4 can be a process control device used to control the process element, such as a process control valve that is controlled by control signals from control room 6 transmitted over control loop 8.

Data pertaining to the process and control signals used to control the process are two forms of process device information. Process device information can be transmitted between control room 6 and process devices 4 over control loops 8 by adjusting the current flowing through control loops 8. For example, two-wire process devices 4 typically adjust the current flowing through loop 8 between a lower alarm level $I_L$ and an upper alarm level $I_U$, commonly 4 mA and 20 mA, respectively, to indicate a value of the process variable being monitored. Additionally, digital information can be transmitted over the control loops 8 in accordance with Highway Addressable Remote Transducer (HART®), FOUNDATION™ Fieldbus, Profibus, Ethernet and other communication protocols commonly used in the industry.

Figure 2:
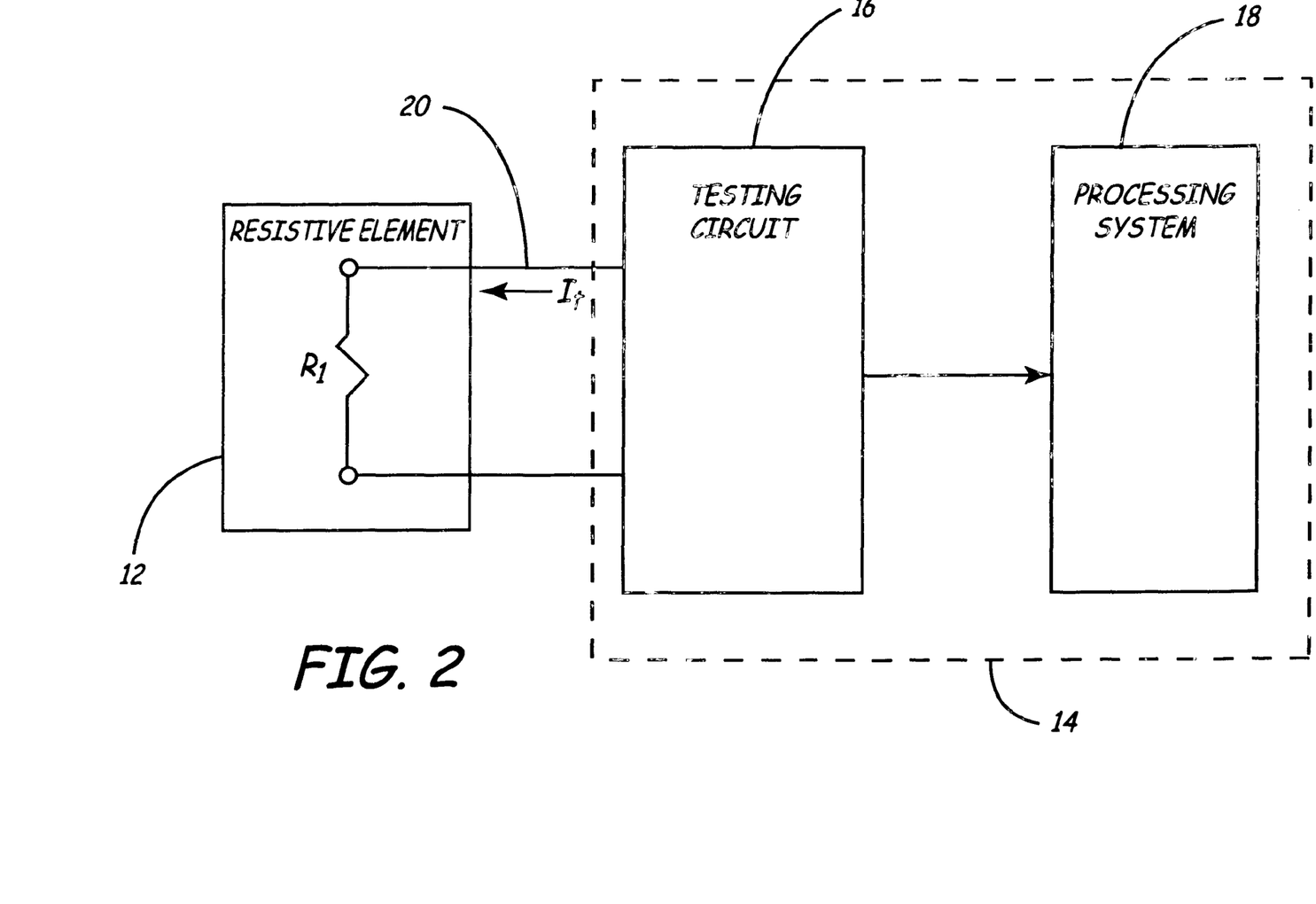
FIG. 2 is a simplified block diagram of an embodiment of the invention.
Figure 3:
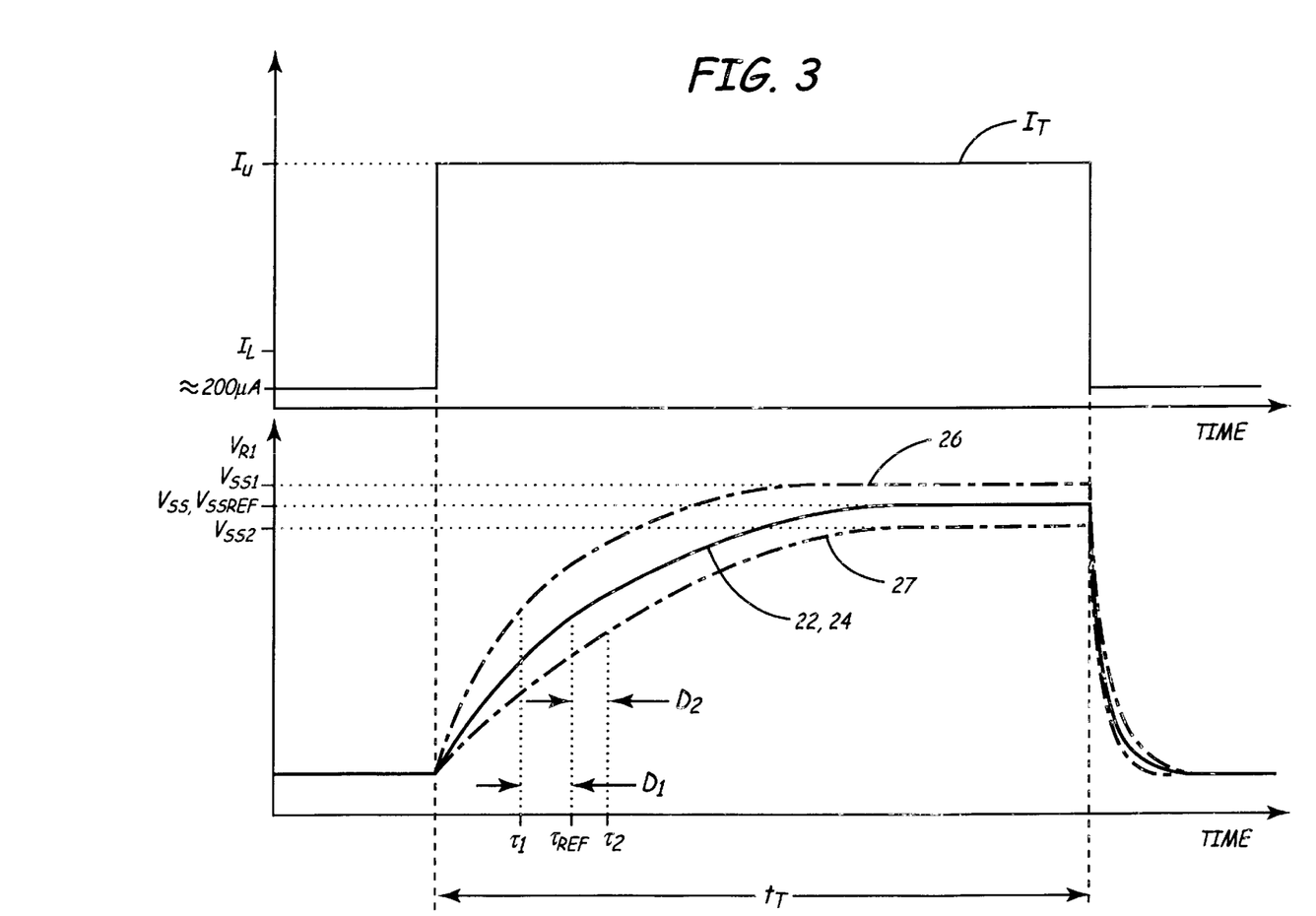
FIG. 3 is a graph of a test signal and a graph of corresponding response signals.

Device 4 can either include or utilize a resistive element 12 having a resistance $R_1$, shown in FIGS. 2 and 3. Resistive element 12 can take on many forms depending on the function of process device 4. If process device 4 is a temperature transmitter, resistive element 12 could be a temperature sensor, such as an RTD (thin-film or wire-wound) sensor or a thermocouple. If process device 4 is a pressure transmitter, resistive element 12 could be a strain gauge. Resistive element 12 can also take the form of a coil of a coriolis flowmeter such as is described in U.S. Pat. No. 5,231,884 issued Aug. 3, 1993. Other possibilities for resistive element 12 include wires, electrical traces, terminations, and other components of process devices 4 having an electrical resistance.

One aspect of the various embodiments includes a recognition that properties of resistive element 12 will change over time due to wear. Such change facilitates detection of degradation of resistive element 12 by comparing a characteristic of resistive element 12 to a reference characteristic representing a resistive element 12 in a good or healthy condition using diagnostic circuitry 14.

FIG. 2 shows a simple block diagram of an embodiment of diagnostic circuitry 14. Diagnostic circuitry 14 includes testing circuit 16 and processing system 18. Testing circuit 16 acts as a test signal source and is coupleable to resistive element 12 through connection 20. Testing circuit 16 is configured to apply test signal $I_T$ to resistive element 12 through connection 20.

Connection 20, shown in FIG. 2, represents any connection or exchange of signals between the resistive element 12 and diagnostic circuitry 14. For example, if resistive element 12 is a process variable sensor and diagnostic circuitry 14 includes a microprocessor, connection 20 provides process variable data to the microprocessor. Similarly, if resistive element 12 is a process control element, the connection 20 provides a control signal from the microprocessor of diagnostic circuitry 14 to resistive element 12.

Test signal $I_T$ can be in the form of a current. In one embodiment, test signal $I_T$ raises or steps the magnitude of the current to resistive element 12 from its nominal level ($\approx 200\ \mu A$) to a higher level (e.g., near the upper alarm level $I_U$) for a test period $t_T$, as shown in FIG. 3. The application of test signal $I_T$ to resistive element 12 heats resistive element 12 and generates a response signal 22, shown in FIG. 3.

Response signal 22 generated by resistive element 12 in response to test signal $I_T$, can take the form of a voltage drop $V_{R1}$ across resistive element 12 as shown in FIG. 3. However, the voltage drop $V_{R1}$ can be converted into a resistance $R_1$ of resistive element 12 using the equation $R_1 = V_{R1}/I_T$. In one embodiment, testing circuit 16 provides processing system 18 with the response signal 22 as indicated by the arrow pointing from testing circuit 16 to processing system 18 shown in FIG. 2.

Processing system 18 is configured to receive response signal 22 from testing circuit 16 and to determine a time constant $\tau$ of the response signal 22. Time constant $\tau$ is defined as the time it takes for the response signal 22 to reach 63.2% of its steady state voltage drop $V_{SS}$ (shown in FIG. 3) across resistance $R_1$, or a steady state resistance value $R_{SS}$ (not shown). The steady state values are defined as the final value of response signal 22, but can be approximated by taking the value of response signal 22 when the rate of change of response signal 22 is sufficiently small. The test period $t_T$ of test signal $I_T$ can be chosen such that the steady state value of response signal 22 is reached prior to the termination of test signal $I_T$.

Time constant $\tau$ of response signal 22 changes as resistive element 12 degrades. Thus, time constant $\tau$ can be used by processing system 18 to detect degradation of resistive element 12 by comparing time constant $\tau$ to a corresponding reference $\tau_{REF}$. FIG. 3 shows three illustrative response signals 230: a reference response signal 24 generated by resistive element 12 when in a good or non-degraded condition, and response signals 26 and 27 which are generated by resistive element 12 when in a degraded condition. Response signals 26 and 27 are two examples of response signals that could be generated by a degraded resistive element 12. Reference response signal 24 reaches a steady state value $V_{SSREF}$ and has a time constant $\tau_{REF}$. Response signals 26 and 27 reach steady state values $V_{SS1}$ and $V_{SS2}$, and have time constants $\tau_1$ and $\tau_2$, respectively. It is possible to have a response signal 22 from a degraded resistive element 12 having a different behavior than those shown in FIG. 3, such as one that has both a higher steady state value $V_{SS}$ and a higher time constant $\tau$ than reference response signal 24.

Degradation of resistive element 12 is indicated by a difference D between the time constant $\tau$ associated with a degraded resistive element 12 and a corresponding reference time constant $\tau_{REF}$. Processing system 18 is configured to establish the difference D. Two such differences $D_1$ and $D_2$ are shown in FIG. 3. Difference $D_1$ represents the difference between the time constant $\tau_1$ of response signal 26 and reference time constant $\tau_{REF}$ of reference response signal 24. Difference $D_2$ represents the difference between the time constant $\tau_2$ of response signal 27 and reference time constant $\tau_{REF}$ of reference response signal 24. The degree to which resistive element 12 has degraded is dependent on the magnitude of difference D. In one embodiment, processing system 18 can provide a diagnostic output as a function of the difference D, indicating the condition of resistive element 12.

Figure 4:
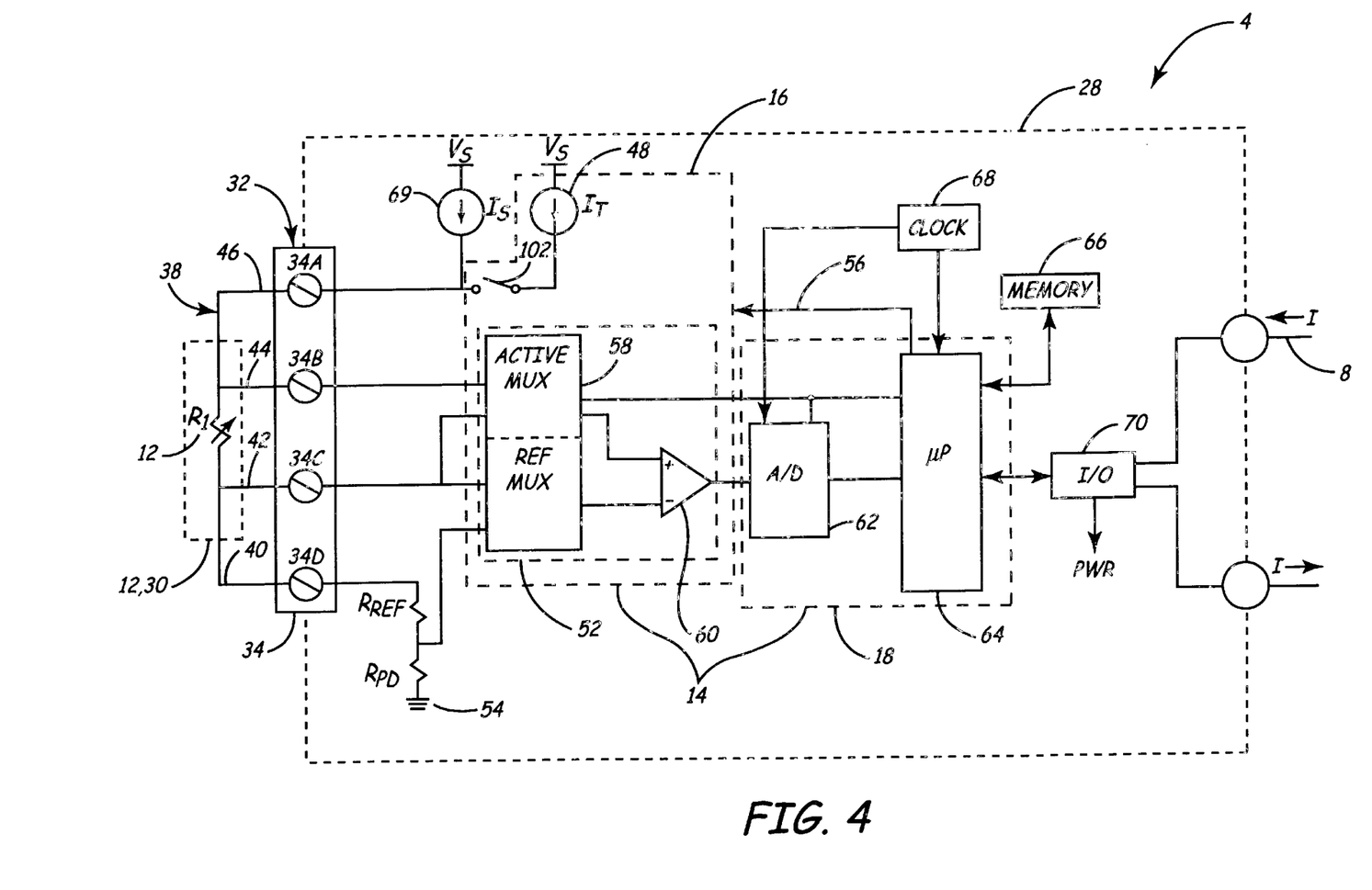
FIG. 4 is a simplified schematic in accordance with one embodiment of the invention.

FIG. 4 shows a simplified schematic of diagnostic circuitry 14 depicted as a component of process device circuitry 28 of a process device 4, such as a temperature transmitter, in accordance with one embodiment of the invention. Here, resistive element 12 of device 4 is depicted as an element of RTD sensor 30 and has a temperature-dependent resistance $R_1$. Sensor 30 can be either internal or external to device 4 and connects to process device circuitry 28 and diagnostic circuitry 14 at connector 32. Connector 32 includes a terminal block 34 having terminals 34A, 34B, 34C, and 34D for coupling to, for example, RTD temperature sensor 30. Sensor 30 connects to process device circuitry 28 at leads 38. Leads 38 are configured as a Kelvin connection and include four element leads 40, 42, 44, and 46. Lead 40 is connected between resistive element 12 and terminal 34D, lead 42 is connected between resistive element 12 and terminal 34C, lead 44 is connected between resistive element 12 and terminal 34B, and lead 46 is connected between resistive element 12 and terminal 34A.

One embodiment of testing circuit 16, shown in FIG. 4, includes current source 48, switch 50, and voltage detector 52. Current source 48 is configured to apply test signal $I_T$ through terminal 34A, resistive element 12, terminal 34D, reference resistance $R_{REF}$, pull-down resistance $R_{PD}$ and ground terminal 54. Resistive element 12 of sensor 30 generates response signal 22 across terminals 34B and 34C which is a function of the resistance $R_1$.

Current source 48 of testing circuitry 16 can be controlled by processing system 18 through connection 56. Connection 56, shown in FIG. 4, is drawn to indicate that it could be used to control several aspects of testing circuit 16 including switch 50. In one embodiment, current source 48 is configured to produce test signal $I_T$. When processing system 18 closes switch 50, test signal $I_T$ is applied to resistive element 12 through connector 32. At the end of test period $t_T$, processing system 18 opens switch 50 to terminate the application of test signal $I_T$. In another embodiment, current source 48 includes a Schmitt Trigger and a voltage-to-current (V-I) converter. The Schmitt trigger can be configured to produce a high voltage to an input of the V-I converter for test period $t_T$ then drop the input to a low or zero voltage at the input to the V-I converter. The V-I converter can be configured to produce test signal $I_T$, while receiving the high voltage from the Schmitt Trigger. The test signal can be directed to resistive element 12 through switch 50. Processing system 18 controls switch 50 and can apply test signal $I_T$ to resistive element 12 as desired.

One embodiment of voltage detector 52 of testing circuit 16 is shown in FIG. 4 and includes multiplexer 58 and differential amplifier 60. Multiplexer 58 is divided into two sections, an active multiplexer having an output connected to the non-inverting input of differential amplifier 60 and a reference multiplexer having an output connected to the inverting input of differential amplifier 60. Multiplexer 58 can multiplex analog signals from terminals 34B, 34C, and the junction between reference resistor $R_{REF}$ and pull-down resistor $R_{PD}$, to the non-inverting and inverting inputs of differential amplifier 60.

FIG. 4 also shows one embodiment of processing system 18 that includes analog-to-digital (A/D) converter 62, microprocessor 64, and memory 66. Memory 66 stores instructions and information for microprocessor 64, including reference response information used for diagnostic purposes, such as reference time constant $\tau_{REF}$. Microprocessor 64 operates at a speed determined by clock circuit 68. Clock circuit 68 includes a real time clock and a precision high speed clock, that are also used to sequence the operation of A/D converter 62. Microprocessor 64 can perform several functions, including control of testing circuit 16, control of communications over loop 8, temperature compensation, storage of transmitter configuration parameters, and diagnostics for resistive element 12. Microprocessor 64 controls multiplexer 58 of voltage detector 52 to multiplex appropriate sets of analog signals, including signals from terminals 34B, 34C, and 34D, to the non-inverting and inverting inputs of differential amplifier 60. Thus, microprocessor 64 can instruct voltage detector 52 to provide A/D converter 62 with the voltage drop across resistance $R_1$ or across terminals 34B and 34C. As a result, when test signal $I_T$ is a applied to resistive element 12, microprocessor 64 can instruct voltage detector 52 to provide A/D converter 62 with the response signal 22 generated by resistive element 12.

In one embodiment, A/D converter 62 has an accuracy of 17 bits and a conversion rate of 14 samples/second. A/D converter 62 converts the voltage from testing circuit 16 into a digital value and provides that value to microprocessor 64 for analysis.

Microprocessor 64 of processing system 18 can signal testing circuit 16 through connection 56 to apply test signal $I_T$ to resistive element 12, as mentioned above. When test signal $I_T$ is applied, resistive element 12 generates response signal 22, in the form of a voltage drop across resistance $R_1$, that can be measured by microprocessor 64 through the control of multiplexer 58 and A/D converter 62. Microprocessor 64 can analyze response signal 22 and determine the time constant $\tau$ of response signal 22 by determining the steady state value $R_{SS}$ ($R_{SS}=V_{SS}/I_T$) as discussed above. Processing system 18 can obtain corresponding reference $\tau_{REF}$ from memory 66 and compare it to time constant $\tau$ to establish difference D, which is indicative of the condition of resistive element 12.

Process device circuitry 28, which includes diagnostic circuitry 14, can be configured to comply with intrinsic safety requirements to allow for the safe operation of process device 4 in hazardous environments. The Intrinsic Safety requirements are set forth in the Factory Mutual Approval Standard entitled "Intrinsically Safe Apparatus and Associated Apparatus for Use in Class I, II, and III, Division 1 Hazardous (Classified) Locations," Class Number 3610, published October 1988. In one embodiment, process device circuitry 28 is loop powered; i.e., wholly (completely) powered by loop 8, which could be a 4–20 mA loop. In another embodiment, process device circuitry 28 can be used in a 2-wire process device 4. In yet another embodiment, process device 4 can be a temperature transmitter and process device circuitry 28 can inject sensor 30 with a measurement current $I_S$ using current source 69 to obtain the temperature of sensor 30.

Process device circuitry 28 can communicate with a process control system over control loop 8 using device input-output (I/O) circuit 70, shown in FIG. 4. In one embodiment of the invention, device I/O circuit 70 communicates with the process control system by adjusting current I between 4 and 20 mA in accordance with a known communication protocol. Suitable communication protocols include HART®, FOUNDATION™ Fieldbus, Profibus, and Ethernet communication protocols. Additional protocols can also be used, for example, a four-wire configuration may be employed in which power is received from a separate source.

Diagnostic circuitry 14 can access device I/O circuit 70 of process device circuitry 28 with microprocessor 64, as shown in FIG. 4. Using device I/O 70, the process control system can signal diagnostic circuitry 14 to perform a diagnostic test on resistive element 12 and, after conducting the test, diagnostic circuitry 14 can transmit a diagnostic output indicating the condition of resistive element 12 back to the process control system. The diagnostic output could take several forms. In one embodiment, the diagnostic output represents the value of difference D. In another embodiment, the diagnostic output is a signal to the process control system that the difference D has exceeded a threshold value, stored in memory 66, indicating that resistive element 12 either needs to be re-calibrated or replaced. In yet another embodiment, the diagnostic output is a signal that is indicative of an approximate life-expectancy of resistive element 12.

As mentioned above, process device circuitry 28 can be used as a temperature transmitter where resistive element 12 is a component of RTD sensor 30 which can be used to measure the temperature $T_0$ of resistive element 12 or of a process medium in which RTD sensor 30 is placed. One procedure that can be used by process device circuitry 28 to measure operating temperature $T_0$ of resistive element 12 includes applying a nominal measurement current $I_S$ through resistive element 12, measuring the voltage drop across the resistance $R_1$ of resistive element 12 $V_{R1}$, measuring the voltage drop $V_{RREF}$ across reference resistor $R_{REF}$, calculating the resistance value $R_1$, and obtaining the temperature corresponding to the resistance value $R_1$ from look-up tables in memory 66.

The measurement current $I_S$ is generated by current source 69. Current source 69 is connected to terminal block 34 and supplies test measurement current $I_S$ through terminal 34A, resistive element 12, terminal 34D, reference resistance $R_{REF}$, pull-down resistance $R_{PD}$ and ground terminal 54. Resistive element 12 of sensor 30 develops a voltage drop across terminals 34B and 34C which is a function of the resistance $R_1$ and, thus, the operating temperature $T_O$ of resistive element 12. Microprocessor 64 measures the voltage drop $V_{R1}$ across resistive element 12 of sensor 30 between terminals 34B and 34C, and the voltage drop $V_{RREF}$ across reference resistance $R_{REF}$ with multiplexer 58, due to measurement current $I_S$. In a four-wire resistance measurement such as the one shown in FIG. 4, the voltage drop across the connections to terminals 34B and 34C is largely eliminated, since substantially all of the current $I_S$ flows between terminals 34A and 34D, and has little impact on the accuracy of the measurement. Microprocessor 64 employs the following equation to compute the resistance $R_1$ of resistive element 12:

$$R_1 = \frac{V_{R1}}{V_{RREF}} (R_{REFNOM}) \qquad \text{Eq. 1}$$

where:

| where: | |
|---|---|
| $R_1$ = | resistance of RTD sensor element 204; |
| $V_{R1}$ = | voltage drop across the RTD sensor element 204; |
| $V_{RREF}$ = | voltage drop across resistance $R_{REF}$; and |
| $R_{REFNOM}$ = | nominal resistance of the reference resistance $R_{REF}$ in Ohms, and/or stored in memory 212. |

Microprocessor 64 converts the measured resistance $R_1$ into temperature units with a look-up table stored in memory 66. Alternatively microprocessor 26 can use an equation, stored in memory 66, such as the Callender-Van Dusen equation which is:

$$R(t) = R_0 \left\{ 1 + \alpha \left( t - \delta \left( \frac{t}{100} \right) \left( \frac{t}{100} - 1 \right) - \beta \left( \frac{t}{100} - 1 \right) \left( \frac{t}{100} \right)^3 \right) \right\} \qquad \text{Eq. 2}$$

Where:
R(t)=Resistance at temperature t, in Ohms.
$R_0$=Resistance at temperature 0 deg. C., Ohm.
t=Temperature, deg C.
α, δ, β=Calibration constants.
β=0 for t>0 deg C.

Thus, microprocessor 64 can obtain the operating temperature $T_O$ of resistive element 12 or the temperature of the process medium in which RTD sensor 30 is placed.

In one embodiment of the invention, process device circuitry 28 can be used in a process measurement transmitter, such as a temperature transmitter, and can produce a process variable output, that is indicative of the process variable being measured, using device I/O circuit 62. When resistive element 12 is an element of the sensor being used to measure the process variable, its degradation can affect the accuracy of the measurement and, thus, the accuracy of the process variable output. Once the degradation of resistive element 12 has been detected and quantified as a difference D, one embodiment of processing system 18 can automatically correct or adjust the process variable output as a function of the difference D. For example, as resistive element 12 of an RTD sensor 30 degrades, the temperature measured by RTD sensor 30 becomes inaccurate due to drift in alpha (α) and/or $R_0$ (shown above in Equation 2). It has been discovered that there is a substantially linear relationship between the difference D and error in the temperature measurement caused by drift in alpha (α) and/or $R_0$. The temperature can be corrected using the equation:

$$T_{corrected} = T_{measured} K(D) \qquad \text{Eq. 3}$$

where:
$T_{measured}$ is the measured temperature;
K is a constant of proportionality which is a function of the difference D; and
$T_{corrected}$ is the autocorrected temperature.

The relationship between K and the difference D may be determined experimentally. Determination of K may be through an equation or, in one embodiment, with a lookup table stored in memory 66 as a function of difference D. Similarly, difference D can be correlated to alpha (α) and $R_0$, or changes in these constants. Further, it is within the scope of the present invention to correlate difference D with other constraints in Equation 2.

One embodiment of diagnostic circuitry 14 can use empirical models or polynomial curve-fitting which are functions of the difference D. For example, a polynomial which is a function of the difference D can be used for computing the residual lifetime estimate or the life expectancy of resistive element 12. The constants and/or the equations may be sent over a two wire loop to process device circuitry 28. In another embodiment, processing system 18 of diagnostic circuitry 14 is implemented with a multi-layer neural network. Although a number of training algorithms can be used to develop a neural network model for different goals, one embodiment includes the known Backpropagation Network (BPN) to develop neural network modules which will capture the nonlinear relationship among a set of input and outputs(s).

Another embodiment of diagnostic circuitry 14 can use a set of if-then rules to reach a conclusion on the status of the resistive element 12, such as that used in an RTD sensor 30. The difference D is monitored and its present value is compared to upper and lower boundaries. The upper and lower boundaries are empirically set by testing of many RTD sensors 30. A decision is made based upon the comparison.

In another aspect of the invention, the rate of change (ROC) of the difference D is correlated with life expectancy of resistive element 12. The ROC of the difference D is provided to the diagnostic circuitry 14 and implemented in microprocessor 64. A diagnostic output can be provided that is indicative of the residual life of resistive element 12, including a warning when the residual life drops below a threshold value.

The various diagnostic functions set forth herein can be performed remotely, in a process control device, in the control room, in a computer located off-site or in a combination of these locations. Generally, the invention can be practiced in any of a number of places in a process system control system. In particular, the present invention as realized in software and a microprocessor, can reside in a central controller or even a final control element such as a valve, motor or switch. Furthermore, modern digital protocols such as Fieldbus, Profibus and others mentioned above, allow for the software which practices the present invention to be communicated between elements in a process control system, and also provide for process variables to be sensed in one transmitter and then sent to the software.

Embodiments diagnostic circuitry 14 can detect other types of degradation in a process device including corrosion of an electrical component. For example, in a wire, termination, coil, RTD, thermocouple, electrical trace on a printed circuit board or other electrical component which corrodes over time, there is a corresponding reduction in area which causes an increase in resistance. The present invention can detect such degradation prior to the ultimate failure of the device. Electrical components may degrade due to use which could also lead to eventual fatigue failure. The electrical element diagnostics of the present invention can detect such fatigue. Further, a loose termination such as occurs with a "cold" solder joint can be detected as the termination degrades.

What is claimed:

1. Diagnostic circuitry for detecting degradation of a resistive element of a process device, the diagnostic circuitry comprising:
   a test signal source coupleable to the resistive element and configured to apply a test signal to the resistive element, wherein the test signal heats the resistive element and generates a response signal;
   a processing system configured to receive the response signal and to compare a time constant of the response signal to a corresponding reference, wherein a difference can be determined between the time constant and the corresponding reference.

2. The diagnostic circuitry of claim 1, wherein the resistive element is selected from the group consisting of a resistance temperature detector, a thermocouple, a strain gauge, and a coil.

3. The diagnostic circuitry of claim 1, further comprising a memory connected to the processing system configured to store the reference.

4. The diagnostic circuitry of claim 1, wherein the process device is wholly loop powered.

5. The diagnostic circuitry of claim 1, wherein the process device is powered by a 4–20 mA loop.

6. The diagnostic circuitry of claim 1, wherein the process device comprises a 2-wire device.

7. The diagnostic circuitry of claim 1, wherein the process device comprises a temperature transmitter.

8. The diagnostic circuitry of claim 1, wherein the diagnostic circuitry is intrinsically safe.

9. The diagnostic circuitry of claim 1, wherein the test signal source is a current source, and wherein the diagnostic circuitry further comprises:
   a switch coupled to the current source wherein actuation of the switch causes the test signal to be applied to the resistive element; and
   a voltage detector configured to detect the response signal generated by the resistive element in response to the test signal.

10. The diagnostic circuitry of claim 1, wherein the processing system is further configured to produce a diagnostic output as a function of the difference.

11. The diagnostic circuitry of claim 10, wherein the diagnostic output is indicative of a condition of the resistive element.

12. The diagnostic circuitry of claim 10, wherein the diagnostic output is indicative of a life expectancy of the resistive element.

13. The diagnostic circuitry of claim 10, wherein the diagnostic output is in accordance with a communication protocol selected from a group consisting of Highway Addressable Remote Transducer, Fieldbus, Profibus, and Ethernet protocols.

14. The diagnostic circuitry of claim 1, wherein the processing system comprises a neural network.

15. The diagnostic circuitry of claim 1, wherein:
   the process device is a process variable transmitter configured to measure a value of a process variable using the resistive element and to produce a process variable output indicative of the value; and
   the processing system is configured to adjust the process variable output as a function of the difference.

16. A method for detecting degradation of a resistive element of a process device, comprising:
   applying a test signal to the resistive element;
   analyzing a response signal generated by the resistive element in response to the test signal, wherein the response signal is related to a resistance of the restive element during application of the test signal;
   determining a time constant of the response signal; and
   comparing the time constant to a corresponding reference.

17. The method of claim 16, further comprising providing a diagnostic output as a function of a difference between the time constant and the corresponding reference.

18. The method of claim 16, wherein the diagnostic output is indicative of a condition of the resistive element.

19. The method of claim 16, wherein the diagnostic output is indicative of a life expectancy of the resistive element.

20. The method of claim 16, further comprising measuring an operating temperature of the resistive element.

21. The method of claim 16, wherein the process device comprises a 2-wire device.

22. An apparatus for detecting degradation of a resistive element of a process device, comprising:
   means for applying a test signal to the resistive element;
   means for analyzing a response signal generated by the resistive element in response to the test signal, wherein the response signal is related to a resistance of the restive element during application of the test signal;
   means for determining a time constant of the response signal; and
   means for comparing the time constant to a corresponding reference.

23. The apparatus of claim 22, wherein the process device comprises a 2-wire device.

24. The apparatus of claim 22, further comprising means for producing a diagnostic output as a function of a difference between the time constant and the corresponding reference.

25. The apparatus of claim 24, wherein the diagnostic output is indicative of a condition of the resistive element.

26. The apparatus of claim 24, wherein the diagnostic output is indicative of a life expectancy of the resistive element.

27. The apparatus of claim 22, further comprising:
   means for establishing a difference between the time constant and the corresponding reference; and means for correcting an output produced by the resistive element as a function of the difference.

28. A computer readable medium having stored instructions executable by a processor capable of diagnosing a resistive element of a process device, the instructions comprising:

instructions for reading a response signal generated by the resistive element in response to a test signal, wherein the response signal is related to a resistance of the restive element during application of the test signal;

instructions for determining a time constant of the response signal;

instructions for reading a corresponding reference; and instructions for comparing the time constant to the reference.

29. The article of claim 28, wherein the process device comprises a 2-wire device.

* * * * *

UNITED STATES PATENT AND TRADEMARK OFFICE
CERTIFICATE OF CORRECTION

PATENT NO. : 6,594,603 B1
DATED : July 15, 2003
INVENTOR(S) : Evren Eryurek et al.

It is certified that error appears in the above-identified patent and that said Letters Patent is hereby corrected as shown below:

Title page,
Item [56], References Cited, U.S. PATENT DOCUMENTS, insert:

```
--09/169,873    10/98     Eryurek et al.
  09/175,832    10/98     Eryurek et al.
  09/257,896    02/99     Eryurek et al.
  09/303,869    05/99     Eryurek et al.
  09/335,212    06/99     Kirkpatrick et al.
  09/344,631    06/99     Eryurek et al.
  09/360,473    07/99     Eryurek et al.
  09/369,530    08/99     Eryurek et al.
  09/383,828    08/99     Eryurek et al.
  09/384,876    08/99     Eryurek et al.
  09/406,263    09/99     Kirkpatrick et al.
  09/409,098    09/99     Eryurek et al.
  09/409,114    09/99     Eryurek et al.
  09/565,604    05/00     Eryurek et al.
  09/576,450    05/00     David L. Wehrs
  09/606,259    06/00     Evren Eryurek
  09/616,118    07/00     Eryurek et al.
  09/627,543    07/00     Eryurek et al.
  09/576,719    05/00     Coursolle et al.
  09/799,824    03/01     Rome et al.--
```

OTHER PUBLICATIONS, insert:

--"On-Line Statistical Process Control for a Glass Tank Ingredient Scale," by R.A. Weisman, IFAC real Time Programming, 1985, pgs. 29-38.

"The Performance of Control Charts for Monitoring Process Variation," by C. Lowry et al., COMMUN. STATIS. - SIMULA., 1995, pgs. 409-437.

"A Knowledge-Based Approach for Detection and Diagnosis of Out-Of-Control Events in Manufacturing Processes," by P. Love et al., IEEE, 1989, pgs. 736-741.

"Internet Protocol Darpa Internet Program Protocol Specification" by, Information Sciences Institute, University of Southern California, RFC 791, September 1981, pp. 1-43.

"Introduction to Emit", emWare, Inc., 1997, pp. 1-22.

"Introduction to the Internet Protocols" by, Charles L. Hedrick, Computer Science Facilities Group, Rutgers University, October 3, 1988, pp. 1-97.

"Is There A Future For Ethernet in Industrial Control?", Miclot et al., Plant Engineering, October 1988, pp. 44-46, 48, 50.

LFM/SIMA Internet Remote Diagnostics Research Project Summary Report, Stanford University, January 23, 1997, pp. 1-6.

UNITED STATES PATENT AND TRADEMARK OFFICE
CERTIFICATE OF CORRECTION

PATENT NO. : 6,594,603 B1
DATED : July 15, 2003
INVENTOR(S) : Evren Eryurek et al.

It is certified that error appears in the above-identified patent and that said Letters Patent is hereby corrected as shown below:

Title page (cont'd),

"Managing Devices with the Web" by, Howard et al., Byte, September 1997, pp. 45-64.

"Modular Microkernel Links GUI And Browser For Embedded Web Devices" by, Tom Williams, pp. 1-2.

"PC Software Gets Its Edge From Windows, Components, and the Internet", Wayne Labs, I&CS, March 1997, pp. 23-32.

Proceedings Sensor Expo, Aneheim, California, Produced by Expocon Managemnet Associates, Inc., April 1996, pp. 9-21.

Proceedings Sensor Expo, Boston, Massachuttes, Produced by Expocon Management Associates, Inc., May 1997, pp. 1-416.

"Smart Sensor Network of the Future" by, Jay Warrior, Sensors, March 1997, pp. 40-45.

"The Embedded Web Site" by, John R. Hines, IEEE Spectrum, September 1996, p. 23.

"Transmission Control Protocol: Darpa Internet Program Protocol Specification" Information Sciences Institute, September 1981, pp. 1-78.

"Advanced Engine Diagnostics Using Universal Process Modeling", by P. O'Sullivan, Presented at the 1996 SAE Conference on Future Transportation Technology, pgs. 1-9.--

Signed and Sealed this

Twenty-sixth Day of October, 2004

JON W. DUDAS
*Director of the United States Patent and Trademark Office*